United States Patent [19]
Komarova et al.

[11] 4,442,718
[45] Apr. 17, 1984

[54] STRAIN GAUGE AND ELECTRIC CIRCUIT FOR ADJUSTMENT AND CALIBRATION OF SAME

[76] Inventors: Galina N. Komarova, ulitsa Dugina, 4, kv. 15; Nadezhda P. Klokova, ulitsa Pushkina, 8, kv. 44; Boris P. Podboronov, Molodezhnaya ulitsa, 30, kv. 50; Georgy M. Piskov, ulitsa Dugina 29, kv. 30, all of Zhukovsky Moskovskoi oblasti, U.S.S.R.

[21] Appl. No.: 355,561

[22] PCT Filed: Jun. 26, 1980

[86] PCT No.: PCT/SU80/00109
§ 371 Date: Feb. 18, 1982
§ 102(e) Date: Feb. 18, 1982

[87] PCT Pub. No.: WO 82/00054
PCT Pub. Date: Jan. 7, 1982

[30] Foreign Application Priority Data
Jun. 9, 1978 [SU] U.S.S.R. .............................. 2626337

[51] Int. Cl.³ .............................................. G01L 1/22
[52] U.S. Cl. .................................................... 73/766
[58] Field of Search ................ 73/766, 862.63, 1 B, 73/1 J; 338/3

[56] References Cited
U.S. PATENT DOCUMENTS
2,547,926 4/1951 Cook ................................ 73/766 X
3,853,000 12/1974 Barnett et al. ................... 73/766 X FOREIGN PATENT DOCUMENTS
2647780 4/1978 Fed. Rep. of Germany .
1443771 7/1976 United Kingdom .
1469644 4/1977 United Kingdom .
1285692 4/1971 U.S.S.R. .

Primary Examiner—Jerry W. Myracle
Attorney, Agent, or Firm—Lilling & Greenspan

[57] ABSTRACT

A strain gauge comprises a tensoresistor sensitive element (1), a mechanical compensating element (10) and a spacer element (9) made of a material whose linear thermal expansion coefficient is substantially lower than the thermal expansion coefficient of the material of the mechanical element (10). The latter carries a heater element (15) and a thermoresistor element (16) intended for programmed straining of the mechanical element (10) in the course of the adjustment and calibration of the gauge. An electric circuit for adjusting and calibrating a strain gauge is a bridge circuit inserted into each of the two adjacent arms of which is a tensoresistor (3,4) of the sensitive element (1). Connected to a vertex (32) of a half-bridge circuit is the heater element (15), whereas to the other vertex (37) thereof is the thermoresistor element (16).

9 Claims, 4 Drawing Figures

STRAIN GAUGE AND ELECTRIC CIRCUIT FOR ADJUSTMENT AND CALIBRATION OF SAME

TECHNICAL FIELD

The present invention relates to means for measuring nonelectric parameters and, more particularly, to strain gauges.

BACKGROUND ART

There are known strain gauges of the type that comprises a sensitive element, such as a tensoresistor element, which interacts with a movable support through which a signal, indicative of the value of strain, is applied to the strain gauge. The sensitive element converts the signal to an electric signal to be subsequently processed by an automatic system for processing and recording strain values (cf., e.g., FRG Application No. 2,647,780 cl. G. 01 B 7/16, published Apr. 27, 1978).

One of the crucial problems in connection with strain gauges of this type is the temperature compensation due to changes of the values of deformation depending on the ambient temperature. There are different solutions to the problem (cf., e.g., USSR Inventor's Certificate No. 301,514, cl. G 01B5/30, published in "Discoveries, Inventions, Industrial Designs and Trade Marks" Gazette No. 14, 1971).

In some cases use is made of thermoresistor compensation elements placed in series with the sensitive elements.

It is also common to use mechanical thermocompensation elements of a material possessing a linear thermal expansion coefficient roughly equal to that of the article subjected to strain measurements. There are cases when the mechanical thermocompensation elements and the article subjected to strain measurements are of the same material.

In such strain gauges the mechanical termocompensation element is rigidly attached to a second support and coupled through a tensoresistor sensitive element to a first support which is movable (cf., e.g., British Patents No. 1,469,644, cl. G 01B 5/30 and No. 1,443,771, cl. G 01 B5/30).

All the above gauges are checked and graduated prior to installation on an article to be tested. After a gauge is installed in place, its graduation and checking are either totally impossible or require much time. For example, a strain gauge may be checked by connecting it into one of the arms of a bridge measuring circuit and by comparing the signal appearing across the diagonally opposite pair of junctions of the bridge to the original and supplemented signal of the same gauge.

In fact, the method boils down to checking the electric circuit alone; no provision is made for checking the entire signal circuit, including the mechanical parts of the strain gauge.

DISCLOSURE OF THE INVENTION

The invention is aimed at providing strain gauge and an electric circuit for adjustment and calibration of same that would make it possible to graduate and calibrate the gauge after installation on an article to be tested.

The foregoing aim is attained by providing a strain gauge which comprises a tensoresistor sensitive element interacting with a movable support through which a signal corresponding to the actual strain value is applied to the strain gauge, a thermoresistor compensation element and a mechanical thermocompensation element made of a material whose linear thermal expansion coefficient is about equal to the thermal expansion coefficient of the material of which are article subjected to strain measurements is made and rigidly coupled to a second support and also coupled, through the tensoresistor sensitive element, to the movable support, the strain gauge being characterized, according to the invention, in that it includes a spacer element which separates the tensoresistor sensitive element from the mechanical thermocompensation element and is of a material whose linear thermal expansion coefficient is substantially lower than the thermal expansion coefficient the material of the mechanical thermocompensation element, and in that the latter carries a heater element and a thermoresistor element which are intended to strain the mechanical thermocompensation element according to a program in the course of adjusting and calibrating the strain gauge after it is placed on the article subjected to strain measurements and after it is brought into operation.

The spacer element may be a strip mounted on the second support.

In case the mechanical thermocompensation element is of steel, an aluminium alloy or titanium, it is expedient that the spacer element should be of Invar, quartz or sapphire.

In order to hold the strain gauge nominal length and also hold its components in place after adjustment and calibration, the gauge should be provided with a bracer to ensure rigid coupling between the two supports.

In order to allow for preliminary adjustment of the tensoresistor sensitive element 7, the strain gauge is provided with two intermediate supports mounted on the spacer element; each of the two intermediate supports carries a movable strip.

The foregoing aim is further attained by connecting the strain gauge elements into an electric circuit comprising two tensoresistor sensitive elements interconnected so as to form a half-bridge, to each of the tensoresistor sensitive elements being connected in series a thermoresistor compensation element, the circuit being characterized, according to the invention, in that one of the vertices of the half-bridge circuit is connected to a heater element connected, in turn, via a switch to an independent power source, whereas the other vertex of the half-bridge circuit is connected to a thermoresistor element in which an electric signal is produced due to a change of the temperature of the mechanical thermoresistor element as it is heated to adjust and calibrate the strain gauge, which signal corresponds to programmed calibration strain.

The strain gauge according to the invention can be adjusted and calibrated after it is placed on an article to undergo strain measurements, and also in the course of operation.

BRIEF DESCRIPTION OF THE DRAWINGS

The invention will be described further by way of example, with reference to the accompanying drawings, wherein.

BEST MODE OF CARRYING OUT THE INVENTION

Figure 1:
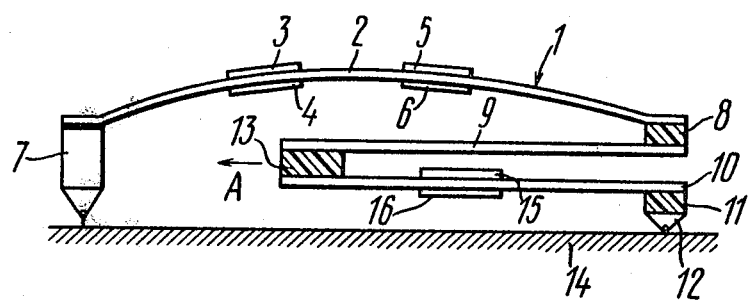
FIG. 1 is a schematic diagram of a strain gauge in accordance with the invention.

Referring to the attached drawings, the strain gauge according to the invention comprises a sensitive element 1 (FIG. 1) which is a strip 2. Attached to the strip 2 are tensoresistors 3 and 4 and thermoresistor compensation elements in the form of resistors 5 and 6.

One end of the element 1 is attached to a movable support 7. The other end of the element 1 is coupled through a thermal insulation member 8 to a spacer element 9.

The strain gauge further contains a mechanical thermocompensating element 10 shaped as a strip whereof one end is coupled through a thermal insulation member 11 to a support 12 and the second end is coupled through a thermal insulation member 13 to the spacer element 9.

The mechanical thermocompensating element 10 is of a material whose linear thermal expansion coefficient $\alpha$ is about equal to that of the material of an article 14 subjected to strain measurements. In most cases the element 10 and article 14 are of the same material. If the gauge according to the invention is used to measure strains in articles made of metal, such as any aluminium alloy, steel and titanium, which means that $\alpha \approx (5-22) \cdot 10^{-6} 1/°C.$, the element 10 is manufactured from the same material.

The spacer element 9 is of a material whose linear thermal expansion coefficient $\alpha_1$ is substantially lower than that of the material from which the element 10 is manufactured. For example, the spacer element 9 may be made from Invar (ferromagnetic iron-nickel alloy), quartz and sapphire, i.e. materials whose linear thermal expansion coefficient is not higher than $(0.5-2) \cdot 10^{-6} 1/°C.$ Arranged on the mechanical element 10 are a heater element 15 and a thermoresistor element 16 which are intended for programmed calibration deformation of the mechanical thermocompensating element 10.

The spacer element in such a case changes the direction of action from the view point of transmitting the compensating and programmed force for calibration of the sensitive element 1 with the linear expansion of the mechanical thermocompensating element 10 due to heating.

The spacer element 9 is a strip rigidly coupled to the second support 12.

Figure 2:
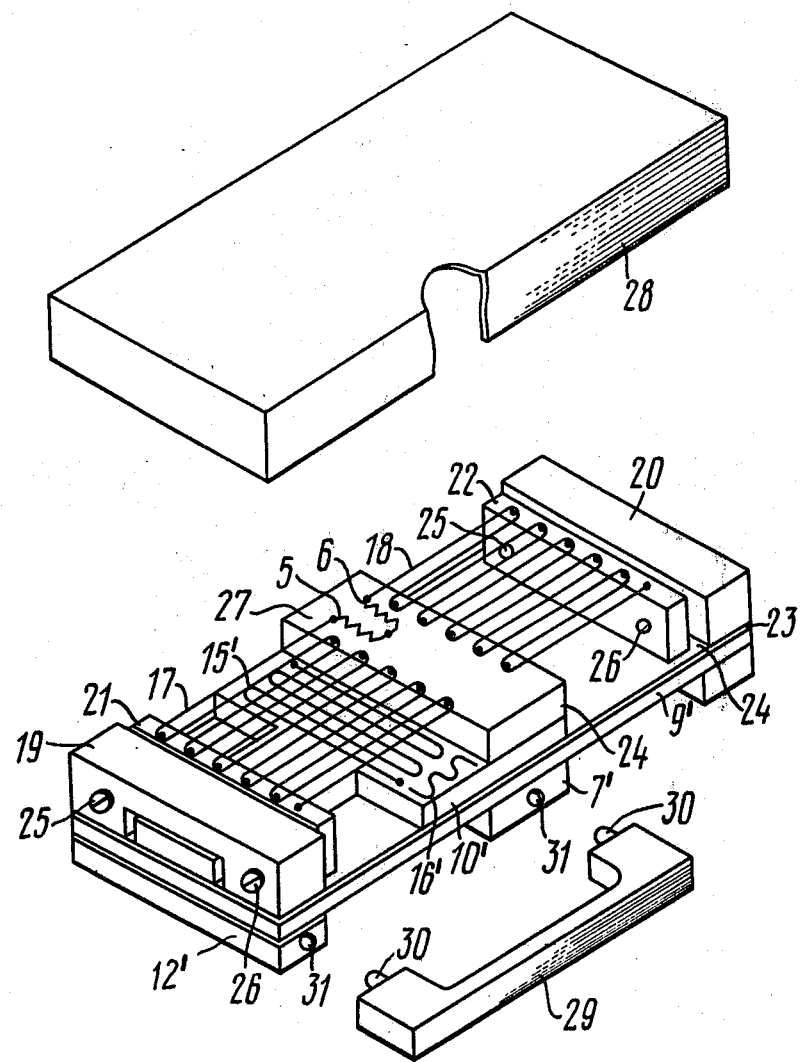
FIG. 2 is a schematic view of an alternative embodiment of the strain gauge in accordance with the invention, with a removed cover and bracer.

FIG. 2 illustrates a structural embodiment of the strain gauge shown in FIG. 1. Therefore, the same reference numerals have been used to describe the gauge elements of the same functional designation, however, such reference numerals in FIG. 2 are primed.

FIG. 2 is a schematic diagram of an alternative embodiment of the strain gauge according to the invention. In this strain gauge version, the sensitive element comprises wires 17 and 18 of a tensosensitive material. The sensitive element is mounted on intermediate supports 19 and 20 provided with movable strips 21 and 22, respectively. The intermediate supports 19 and 20 are arranged at the opposite ends of the spacer element 9' on which there is a thermally insulating layer 23.

To make the strips 21 and 22 movable, there is a gap 24 between these strips 21 and 22 and the intermediate supports 19 and 20, respectively. The strips 21 and 22 are provided with screws 25 and 26, respectively.

The mechanical thermocompensating element 10' is not coupled to the spacer element 9'; instead, it is rigidly cantilevered on the support 12'; a central support 27 is arranged at the opposite end of the element 10.

The element 10' carries the heater element 15, which is a wire, and the thermoresistor element 16'.

The strain gauge further includes a cover 28 which is removed in the drawing to show the gauge components.

Finally, the gauge includes a bracer 29 which has pins 30 to be received in holes 31 provided in the supports 7' and 12'; the bracer 29 serves to hold the strain gauge in place and all its components together.

All the strain gauge components are electrically interconnected. The connection diagram is presented in FIG. 3.

The tensoresistors 3 and 4 of the sensitive element 1 make up a half-bridge circuit and are placed in series with the resistors 5 and 6, respectively, of the thermoresistor compensation element.

A vertex 32 of the half-bridge is connected to the heater element 15. A lead 33 of the heater element 15 and a lead 34 of the vertex 32 are connected via a switch 35 to a d.c. source 36 which heats the element 15.

A vertex 37 of the half-bridge is connected to a thermoresistor element 16. A lead 38 of the element 16 and a lead 39 of the vertex 37 are connected via a switch 40 to a temperature increment measuring unit 41.

For taking measurements and for adjusting and calibrating the strain gauge, the elements making up the half-bridge circuit are connected to another half-bridge circuit composed of resistors 42 and 43. The whole is a measuring bridge circuit with a zero crossing detector 44 connected in its diagonal.

The strain gauge according to the invention is adjusted and calibrated as follows.

The mechanical thermocompensating element 10 undergoes programmed heating. Programmed heating is to be understood as rapid heating of the element 10 to a temperature of 100° to 150° C. and taking measurements through equal temperature increments. To heat the element 10, the switch 35 is brought into play to connect the heater element 15 to the power source 36. At the same time the thermoresistor element 16 is connected by the switch 40 to the temperature increment measurement unit 41.

At an instant corresponding to a prescribed increment of temperature of the mechanical thermocompensating element 10, the switches 35 and 40 are switched off, and the strain gauge is connected via a special unit (not shown) to a measuring device which records the strain value corresponding to the increment $\Delta T$ of the temperature of the element 10.

Figures 3, 4:
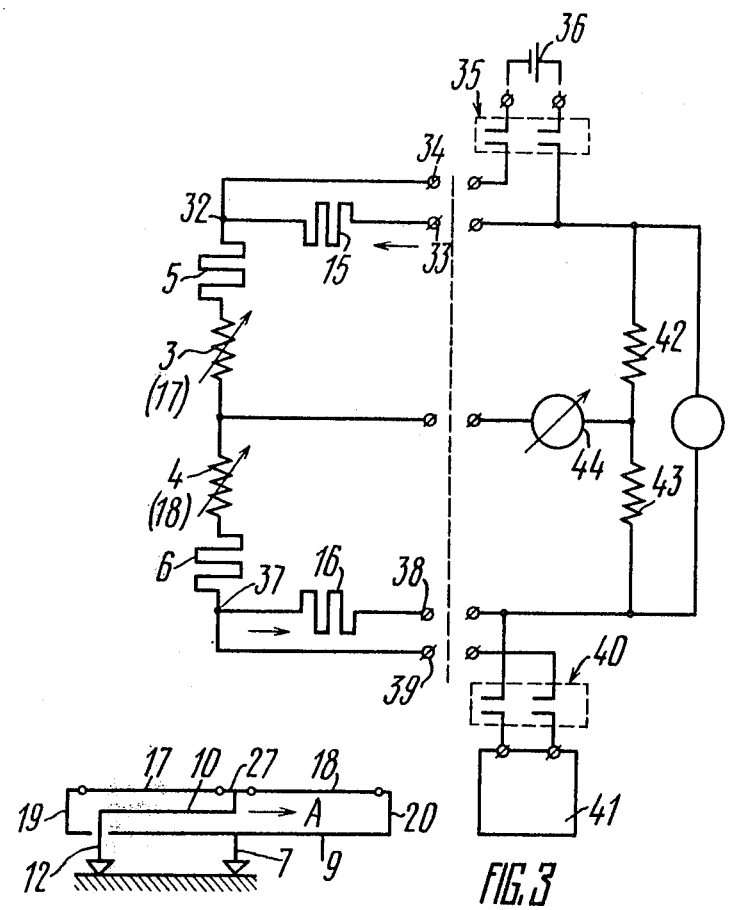
FIG. 3 is a circuit diagram of a strain gauge in accordance with the invention, showing the electric connection of its elements.
FIG. 4 is a schematic diagram of a strain gauge in accordance with the invention, illustrating operation of the strain gauge.

In FIGS. 1 and 4, the arrow A conventionally indicates the direction of linear expansion of the mechanical thermocompensating element 10, which is proportional to the increment of the latter's temperature:

$$\Delta l = l_0 \cdot \alpha \cdot \Delta T,$$

where
  $l_0$ is the original length of the element 10;
  $\alpha$ is the linear expansion coefficient of the material of the element 10; and
  $\Delta T$ is the temperature increment of the element 10.

The deformation of the sensitive element 1 (17, 18) is proportional to Δl.

Thus it is possible to calibrate the strain gauge placed on an article to be subjected to strain measurements and check the entire signal circuit at any moment prior to testing the article.

The results "y" of the tests are processed with the aid of the least squares method. A computer (not shown) produces this polynomial functional relation: $y = a_0 + a_1 X + a_x X^2 + \ldots$, where X is a conventional calibrating strain value directly proportional to the increment ΔT of temperature of the mechanical thermocompensating element 10, and $a_0, a_1, a_2$, etc. are polynomial coefficients.

To produce the above functional relation, measurements are taken through equal temperature increments (ΔT = const); it can be assumed for all practical purposes that these increments are linearly related to the deformation of the sensitive element 1(17, 18). As a result, the initial ambient temperature and the initial temperature of the article or structure whose strain is to be measured have no practical effect on the result of the calibration.

The calibration being over, the switch 35 disconnects the d.c. source 36 from the measuring circuit throughout the strain measurement period.

It should be noted that during calibration of the strain gauge the deformation of the sensitive element 1 or tensoresistor wire sensitive elements 17, 18 will occur with taking into account the effect of the article under test.

The strain gauge according to the invention operates as any conventional strain gauge. In order to rigidly secure the gauge on an article 14 to be tested, and adhesive in used to bond the supports 7 and 12 to the surface of the article 14.

The strain of the surface of the article 14 changes the initial distance between the supports 7 and 12; this leads to a strain of the sensitive element 1 (17, 18), which strain is measured by the well-known bridge circuit.

The strain gauge according to the invention has some significant advantages over conventional gauges.

First, it opens up a fundamentally new approach to metrological evaluation and certification of measuring equipment, including strain gauges mounted on an article.

The increased accuracy of measurements, expecially in the case of service life evaluation tests, is equivalent to a 10 to 20 percent increase of the life of articles or structures involved in the tests.

Second, the service life of strain gauges themselves is made much longer, which considerably cuts down the costs involved in the assembly and placement of a strain gauge on an article to be tested, as well as in the calibration of the gauge on the article.

In the course of prolonged testing, there is a possibility of evaluating the changes in the properties of the adhesive joint between the gauge supports to the article being tested. There is also ample opportunity for testing the state of all the gauge components, as well as of the signal circuit and the measuring unit, using the sensitive element of the gauge as a standard source of information.

INDUSTRIAL APPLICABILITY

The invention is applicable to automatic devices for processing and recording the values of mechanical deformations or strains brought about in critical elements of structures under prolonged effects of variable loads and temperatures in the course of operation.

What we claim is:

1. A strain gauge comprising a tensoresistor sensitive element which interacts with a movable support through which a signal corresponding to the actual strain value is applied to the gauge, a thermoresistor compensating element and a mechanical thermocompensating element made of a material whose linear thermal expansion coefficient is about equal to the thermal expansion coefficient of the material of the article subjected to strain measurements and rigidly coupled to a second support and connected through the tensoresistor sensitive element to the movable support characterized in that it has a spacer element (9) separating the tensoresistor sensitive element (1) from the mechanical thermocompensating element (10) and made of a material whose linear thermal expansion coefficient is much lower than the thermal expansion coefficient of the material of the mechanical thermocompensating element (10), and in that a heater element (15) and a thermoresistor element (16) are arranged on the mechanical thermocompensating element (10) and intended for programmed straining of the mechanical thermocompensating element (10) in the course of the adjustment and calibration of the strain gauge after the latter is placed on the article which is to undergo testing.

2. A strain gauge as claimed in claim 1, characterized in that the spacer element (9) is a strip mounted on the second support (12).

3. A strain gauge as claimed in claims 1 or 2, characterized in that the spacer element (9) is of a ferromagnetic iron-nickel alloy featuring an abnormally low linear thermal expansion coefficient, or of quartz or sapphire, provided that the mechanical thermocompensating element (10) is of steel, an aluminium alloy or titanium.

4. A strain gauge according to claim 1, comprising an electric circuit for adjusting and calibrating the strain gauge which consists of a measuring bridge circuit with one tensoresistor (3 or 4) of the tensoresistor sensitive element (1) being connected in each of the two adjacent arms of the bridge circuit, each of the tensoresistors (3 or 4) being placed in series with a resistor (5 or 6) of the thermoresistor compensating element so that a half-bridge circuit is produced characterized in that one of the vertices (32) of the half-bridge is connected to a heater element (15) connected, in turn, via a switch (35) to an independent power source (36), the other vertex (37) of the half-bridge is connected to a thermoresistor element (16) in which an electric signal is produced as a result of a change of the temperature of the mechanical thermocompensating element (10) as the latter is heated in the course of strain gauge calibration, the electric signal corresponding to programmed calibration strain values.

5. A strain gauge comprising a tensoresistor sensitive element which interacts with a movable support through which a signal corresponding to the actual strain value is applied to the gauge, a thermoresistor compensating element, a mechanical thermocompensating element made of a material whose linear thermal expansion coefficient is about equal to the thermal expansion coefficient of the material of the article subjected to strain measurements and rigidly coupled to a second support and connected through the tensoresistor sensitive element to the movable support, characterized in that it comprises a bracer (29) which rigidly holds the two supports (7, 12) together, fixes the gauge nominal length and also holds the gauge in place after adjustment, and further comprises a spacer element (9) separating the tensoresistor sensitive element (1) from the mechanical thermocompensating element (10) and made of a material whose linear thermal expansion coefficient is much lower than the thermal expansion coefficient of the material of the mechanical thermocompensating element (10) while a heater element (15) and a thermoresistor element (16) are arranged on the mechanical thermocompensating element (10) and intended for programmed straining of the mechanical thermocompensating element (10) in the course of the adjustment and calibration of the strain gauge after the latter is placed on the article which is to underto testing.

6. A strain gauge as claimed in claim 5, characterized in that the spacer element (9) is a strip mounted on the second support (12).

7. A strain gauge as claimed in claim 5, characterized in that the spacer element (9) is of a ferromagnetic iron-nickel alloy featuring an abnormally low linear thermal expansion coefficient, or of Invar, quartz or sapphire, provided that the mechanical thermocompensating element (10) is of steel, aluminum alloys or titanium.

8. A strain gauge comprising a tensoresistor sensitive element which interacts with a movable support through which a signal corresponding to the actual strain value is applied to the gauge, a thermoresistor compensating element, a mechanical thermocompensating element made of a material whose linear thermal expansion coefficient is about equal to the thermal expansion coefficient of the material of the article subjected to strain measurements and rigidly coupled to a second support and connected through the tensoresistor sensitive element to the movable support, characterized in that it comprises a spacer element (9) fashioned as a strip mounted on the second support (12), said spacer element separating the tensoresistor sensitive element (1) from the mechanical thermocompensating element (10) and being made of a material whose linear thermal expansion coefficient is much lower than the thermal expansion coefficient of the material of the mechanical thermocompensating element (10) while a heater element (15) and a thermoresistor element (16) are arranged on the mechanical thermocompensating element (10) and intended for programmed straining of the mechanical thermocompensating element (10) in the course of the adjustment and calibration of the strain gauge after the latter is placed on the article which is to undergo testing, said strain gauge further comprising two intermediate supports (19, 20) mounted on the spacer element (9), each carrying a movable strip (21, 22) for preliminary adjustment of the tensoresistor sensitive element (1).

9. A strain gauge as claimed in claim 8, characterized in that the spacer element (9) is of a ferromagnetic iron-nickel alloy featuring an abnormally low linear thermal expansion coefficient, or of Invar, quartz or sapphire, provided that the mechanical thermocompensating element (10) is of steel, aluminum alloys or titanium.

* * * * *